US010169566B1

(12) United States Patent
Mossoba et al.

(10) Patent No.: US 10,169,566 B1
(45) Date of Patent: Jan. 1, 2019

(54) AUTHENTICATION USING EMOJI-BASED PASSWORDS

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/045,442

(22) Filed: Jul. 25, 2018

(51) Int. Cl.
*G06F 21/00* (2013.01)
*G06F 21/36* (2013.01)
*G06F 17/22* (2006.01)
*H04L 9/32* (2006.01)

(52) U.S. Cl.
CPC .............. *G06F 21/36* (2013.01); *G06F 17/22* (2013.01); *H04L 9/3226* (2013.01)

(58) Field of Classification Search
None
See application file for complete search history.

(56) References Cited

U.S. PATENT DOCUMENTS 8,826,406 B2 9/2014 Ahn et al.
9,740,835 B2 8/2017 Baker et al.
2007/0250920 A1* 10/2007 Lindsay .................. G06F 21/31 726/7
2007/0266428 A1* 11/2007 Downes .................. G06F 21/36 726/5
2010/0083353 A1* 4/2010 Wang ...................... G06F 21/36 726/5
2011/0055585 A1* 3/2011 Lee ....................... H04L 9/0844 713/183
2012/0260326 A1* 10/2012 Steigmann ............ H04L 63/083 726/7
2013/0097683 A1* 4/2013 Davis .................... G06F 21/316 726/7
2013/0097697 A1* 4/2013 Zhu ........................ G06F 21/31 726/18

(Continued)

OTHER PUBLICATIONS

ArunPrakash, M.; Gokul, T.R. Network Security-Overcome Password Hacking Through Graphical Password Authentication. 2011 National Conference on Innovations in Emerging Technology. https://ieeexplore.ieee.org/stamp/stamp.jsp?tp=&arnumber=5738831 (Year: 2011).*

(Continued)

*Primary Examiner* — Jeremiah L Avery
(74) *Attorney, Agent, or Firm* — Harrity & Harrity, LLP

(57) ABSTRACT

An application platform may receive an input from a user associated with a user account. The input may relate to a request for access to the user account, and include a selection of emojis or images. The application platform may identify text strings associated with the emojis or images, where each text string may correspond to a respective emoji or image. The application platform may perform an action to generate a combined text string based on the text strings, and process the combined text string to derive an output value after performing the action. The application platform may determine whether the output value corresponds to a particular value after processing the combined text string, and authenticate the user to permit the user to access the user account based on determining whether the output value corresponds to the particular value.

20 Claims, 8 Drawing Sheets

400

410 Receive an input from a user, the user being associated with a user account, the input relating to a request for access to the user account, and including a selection of a plurality of emojis 420 Identify a plurality of text strings associated with the plurality of emojis after receiving the input, each text string, of the plurality of text strings, corresponding to a respective emoji of the plurality of emojis 430 Perform an action to generate a combined text string based on the plurality of text strings 440 Process the combined text string to derive an output value after performing the action 450 Determine whether the output value corresponds to a particular value after processing the combined text string 460 Authenticate the user to permit the user to access the user account based on determining that the output value corresponds to the particular value

(56) References Cited

U.S. PATENT DOCUMENTS

| | | | | |
|---|---|---|---|---|
| 2013/0133052 | A1* | 5/2013 | Davis | G06F 21/316 726/7 |
| 2013/0152176 | A1* | 6/2013 | Courtney | G06F 21/36 726/5 |
| 2014/0068754 | A1* | 3/2014 | Burkill | G06F 21/36 726/18 |
| 2015/0178490 | A1* | 6/2015 | Tamboly | G06F 21/36 726/4 |
| 2015/0271164 | A1* | 9/2015 | Hamid | H04L 63/0853 726/7 |
| 2018/0288026 | A1* | 10/2018 | Callaghan | H04L 63/08 |

OTHER PUBLICATIONS

Shen, Sung-Shiou et al. Random Graphic User Password Authentication Scheme in Mobile Devices. 2017 International Conference on Applied System Innovation (ICASI). https://ieeexplore.ieee.org/stamp/stamp.jsp?tp=&arnumber=7988123 (Year: 2017).*

Bhand, Amol et al. Enhancement of Password Authentication System Using Graphical Images. 2015 International Conference on Information Processing (ICIP). https://ieeexplore.ieee.org/stamp/stamp.jsp?tp=&arnumber=7489381 (Year: 2015).*

Gunaseeli, L.; Dr. Canessane, R. Aroul. Graphical Passwords Implies on Tolerance Password, Image Choice, and Puzzle Login Security. 2017 International Conference on Information Communication and Embedded Systems (ICICES). https://ieeexplore.ieee.org/stamp/stamp.jsp?tp=&arnumber=8070758 (Year: 2017).*

Florian Schaub, "Why emojis might be your next password," The Conversation, https://theconversation.com/why-emojis-might-be-your-next-password-76973, May 3, 2017, 3 pages.

Lee Munson, "Will emoji passcodes put a smile on your face?", Naked Security by Sophos, https://nakedsecurity.sophos.com/2015/06/16/could-emojis-replace-passcodes-in-online-banking/, Jun. 16, 2015, 12 pages.

* cited by examiner

AUTHENTICATION USING EMOJI-BASED PASSWORDS

BACKGROUND

Emojis are graphics that many people use to express themselves in communications, such as text messages, online chats, and/or the like.

SUMMARY

According to some possible implementations, a method may include receiving, by a device, an input from a user. The user may be associated with a user account. The input may relate to a request for access to the user account, and include a selection of a plurality of emojis. The method may include identifying, by the device, a plurality of text strings associated with the plurality of emojis after receiving the input. Each text string, of the plurality of text strings, may correspond to a respective emoji of the plurality of emojis. The method may include performing, by the device, an action to generate a combined text string based on the plurality of text strings, processing, by the device, the combined text string to derive an output value after performing the action, determining, by the device, whether the output value corresponds to a particular value after processing the combined text string, and authenticating, by the device, the user to permit the user to access the user account based on determining that the output value corresponds to the particular value.

According to some possible implementations, a device may include one or more memories, and one or more processors, communicatively coupled to the one or more memories, configured to receive an input from a user. The user may be associated with a user account. The input may relate to a request for access to the user account, and include a selection of a plurality of emojis or images. The one or more processors may be configured to identify a plurality of text strings associated with the plurality of emojis or images after receiving the input. Each text string, of the plurality of text strings, may correspond to a respective emoji or image of the plurality of emojis or images. The one or more processors may be configured to perform an action to generate a combined text string based on the plurality of text strings, process the combined text string to derive an output value after performing the action, determine whether the output value corresponds to a particular value after processing the combined text string, and selectively authenticate the user to selectively permit the user to access the user account based on determining whether the output value corresponds to the particular value.

According to some possible implementations, a non-transitory computer-readable medium may store instructions that include one or more instructions that, when executed by one or more processors of a device, cause the one or more processors to receive a user input in connection with a request to access a resource. The user input may include a selection of a plurality of emojis or images. The one or more instructions, when executed by the one or more processors, may cause the one or more processors to identify a plurality of text strings associated with the plurality of emojis or images after receiving the input. Each text string, of the plurality of text strings, may correspond to a respective emoji or image of the plurality of emojis or images. The one or more instructions, when executed by the one or more processors, may cause the one or more processors to perform an action to generate a combined text string based on the plurality of text strings, process the combined text string to derive an output value after performing the action, determine whether the output value corresponds to a particular value after processing the combined text string, and permit the user to access the resource based on determining that the output value corresponds to the particular value.

DETAILED DESCRIPTION

The following detailed description of example implementations refers to the accompanying drawings. The same reference numbers in different drawings may identify the same or similar elements.

In a typical password system (e.g., for accessing content over the Internet and/or the like), text-based passwords are stored in a database as an encrypted value (e.g., salted with a salt value, and hashed using one or more hashing algorithms). In many cases, however, a malicious actor—e.g., a hacker—may breach the database, retrieve the encrypted values, and crack the passwords using brute force techniques. In such cases, the less complex a password is, the easier, and quicker, it may be for a malicious actor to uncover the password.

Some implementations, described herein, provide a password system—e.g., an application platform—that permits user authentication using emoji-based, or image-based, passwords. In some implementations, the application platform may include, or have access to, a first data structure that stores, for each password, a mapping of emojis, or images, and corresponding text phrases that form the password, and a second data structure, separate from the first data structure, that stores a salted and hashed version of the password. The application platform may be capable of providing a user with various emojis, or images, for selection, identifying text phrases, in the first data structure, that correspond to the selected emojis or images, combining the identified text phrases into a password (e.g., by concatenating the text phrases), and processing the password (e.g., by salting and/or hashing the password) to determine if a result of the processing matches a value stored in the second data structure.

In this way, the information needed, by a malicious actor to fully uncover a user's password, may be stored in separate places (e.g., separate data structures), which provides an additional layer of password security, since the malicious actor will need to breach not one, but two data structures in order to obtain the information. In addition, permitting emojis, or images, to be mapped to text phrases (e.g., customized text phrases, and not Unicodes that are typically associated with emojis) provides a user with flexibility in choosing a long and unique password (e.g., including many emojis, or images, mapped to many text phrases), which is more difficult, and more time consuming, for a malicious actor to decipher than a typical password, thereby further improving password security. Furthermore, a password based on emojis, or images, is easier to remember, which reduces or eliminates a need for a user to change the password (in the event that the user forgets the password), thereby conserving computing resources and memory resources that would otherwise need to be expended to facilitate password recovery, and improving the user's overall experience.

Figure 1A:
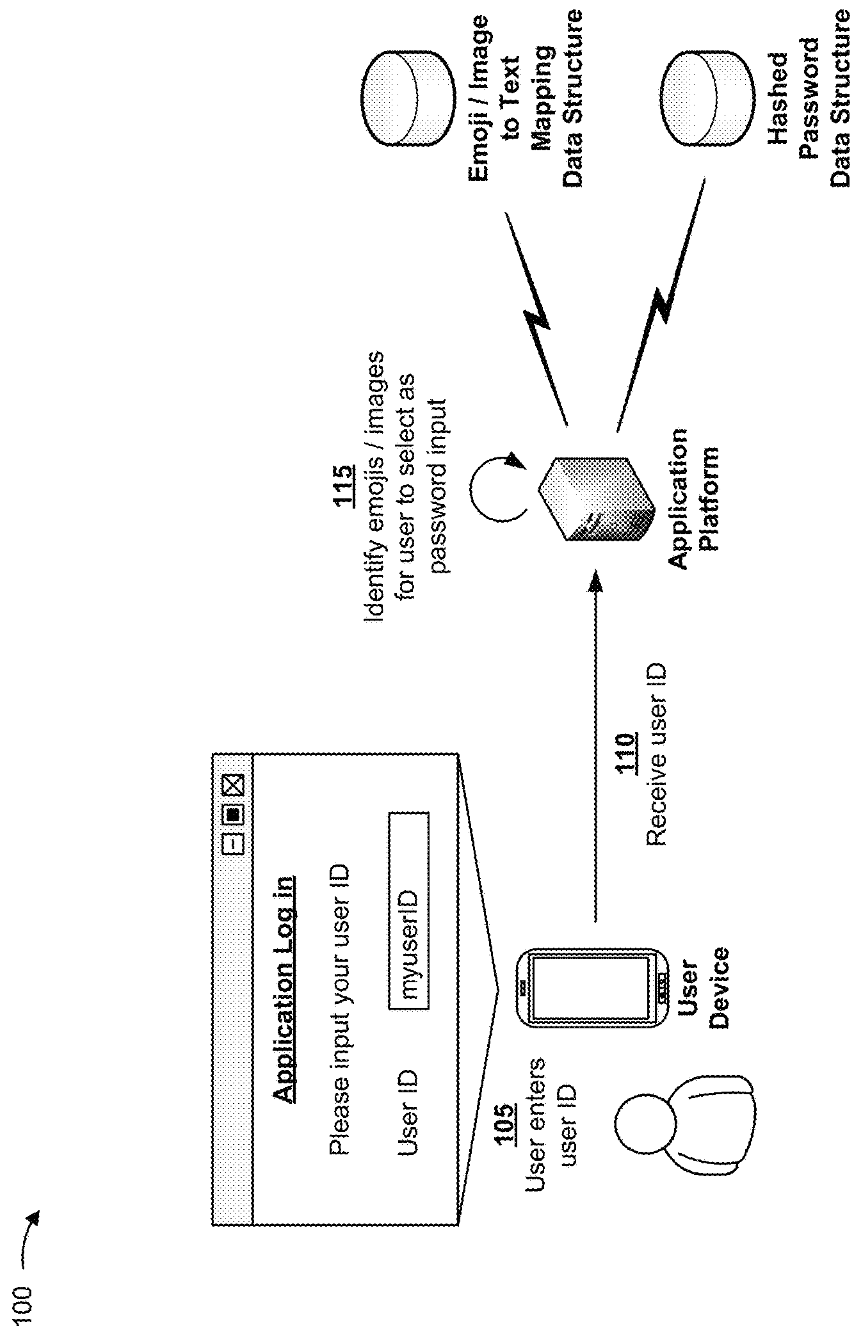
FIGS. 1A-1C are diagrams of an example implementation described herein.
Figure 1B:
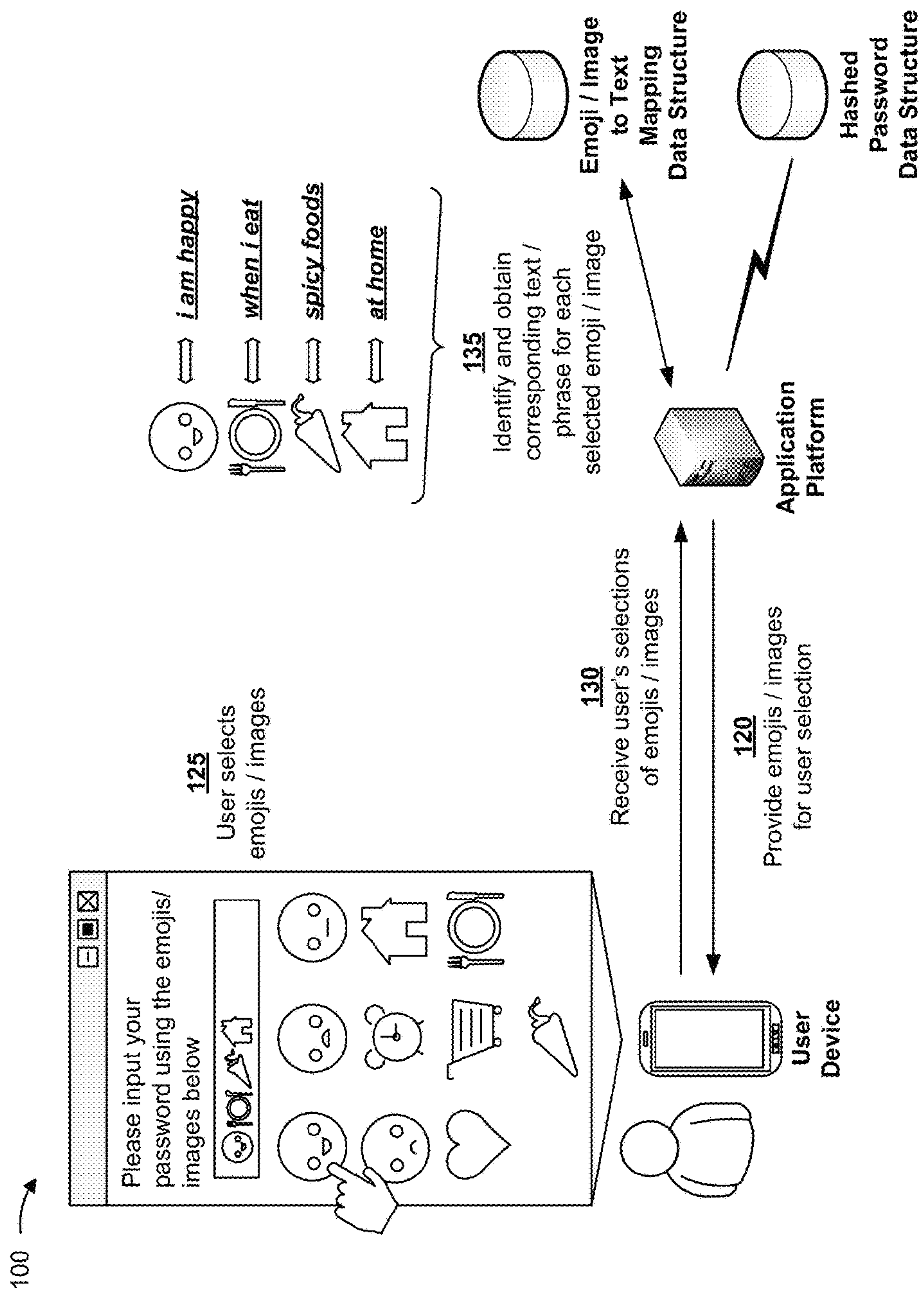
Figure 1C:
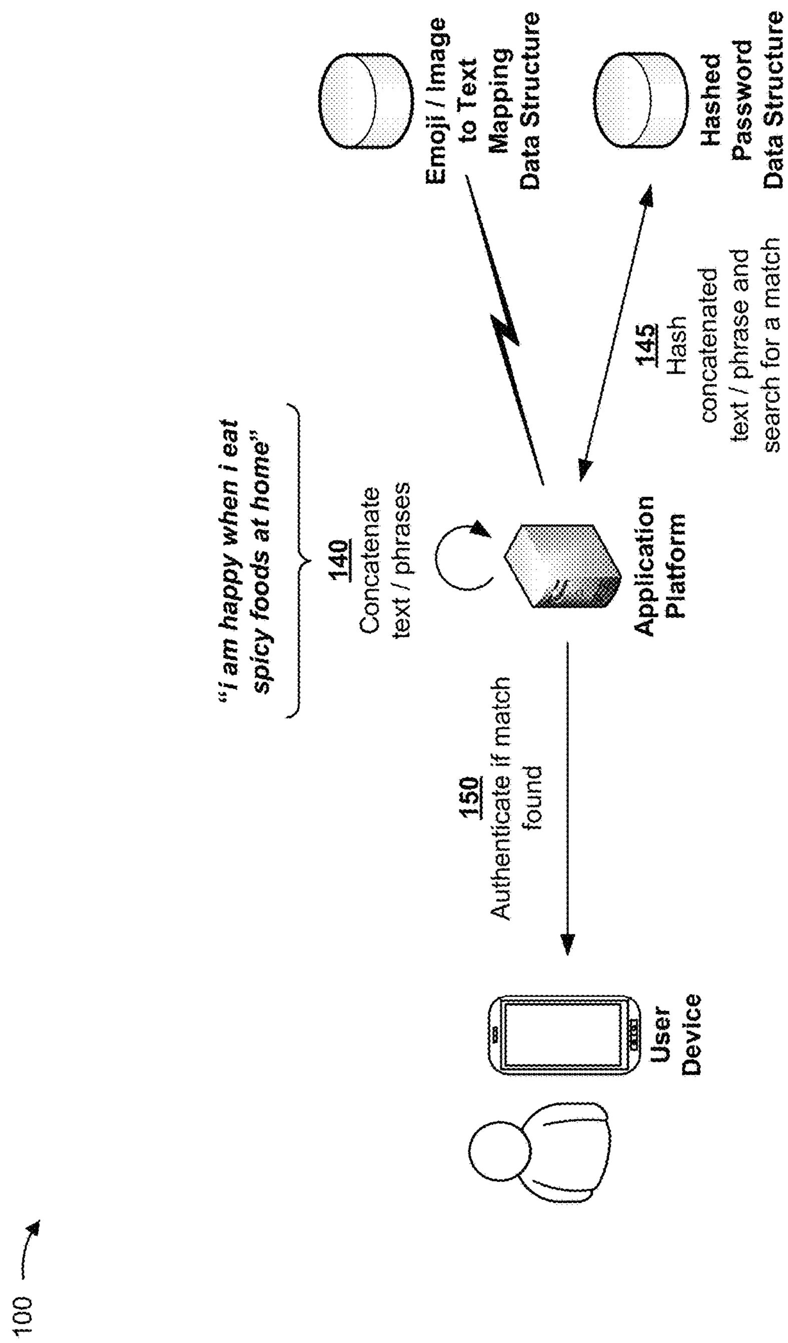

FIGS. 1A-1C are diagrams of an example implementation 100 described herein. As shown in FIGS. 1A-1C, example implementation 100 may include a user device, and an application platform, that, along with various data structures (e.g., databases, arrays, linked lists, tables, tries, and/or the like), including an emoji/image to text mapping data structure and a hashed password data structure, implements a password system. The user device may include any computing device, such as a mobile device (e.g., a smartphone), an automated teller machine (ATM) device, and/or the like, that is capable of interacting with the application platform. The application platform may be associated with any entity (e.g., a financial institution (e.g., a bank), an online retailer, a gaming entity, and/or the like), and may store and/or manage user account data.

In some implementations, the emoji/image to text mapping data structure may store, for each user, information identifying the user (e.g., a user ID, a user name, and/or the like), various emojis and/or images selected, or provided, by the user, and corresponding text phrases selected, or provided, by the user. In some implementations, an application programming interface (API) may be provided to enable access to the emoji/image to text mapping data structure.

In some implementations, the hashed password data structure may store, for each user, information identifying the user (e.g., a user ID, a user name, and/or the like), and a hashed value derived from the user's chosen text phrases (e.g., derived, from a concatenation of the text phrases, using one or more hashing algorithms). In some implementations, the hashed password data structure may also store, for each user, a salt value (e.g., which may be unique for each user) that may be used when deriving the hashed value.

In some implementations, the emoji/image to text mapping data structure and the hashed password data structure may be stored in, or be accessible to, the application platform. In some implementations, the emoji/image to text mapping data structure and the hashed password data structure may be managed by the entity that provides the application platform.

As an alternative, in some implementations, the emoji/image to text mapping data structure may be managed by a third party that is affiliated with the entity, while the hashed password data structure may be managed by the entity. In such cases, even if the entity's system is compromised (e.g., fully compromised) by a malicious actor, users' passwords would nevertheless be secure by virtue of the emoji/image to text mapping data structure being managed separately by the third party.

As another alternative, in some implementations, two or more third parties, that are affiliated with the entity, may manage or store different portions of an emoji/image to text mapping data structure (e.g., two separate data structures), or the entity may manage a portion of the emoji/image to text mapping data structure and a third party may manage another portion of the emoji/image to text mapping data structure (e.g., as two separate data structures). This similarly, or further, protects the overall password system. In such cases, the application platform may be configured to determine (e.g., look up based on a lookup table and/or the like) which emoji, or image, is stored in which portion of the emoji/image to text mapping data structure, so that the application platform can appropriately identify the text phrases mapped to a user's selected emojis or images.

As shown in FIG. 1A, and as shown by reference number 105, a user may input the user's user ID into the user device, and as shown by reference number 110, the application platform may receive the user ID from the user device. As shown by reference number 115, the application platform may identify emojis and/or images for the user to select as an input of the user's password. For example, the application platform may identify, in the emoji/image to text mapping data structure, emojis and/or images for the user based on the user's user ID. In some implementations, a user may configure a password by providing (e.g., by uploading and/or the like) one or more images, such as Joint Photographic Experts Group (JPEG) files, Tagged Image File Format (TIFF) files, Graphics Interchange Form (GIF) files, Portable Network Graphics (PNG) files, Bitmap (BMP) files, and/or the like, to the application platform, and defining text phrases for each such image. For example, a user may define the phrase "I am happy" for a happy-face emoji or image, the phrase "when I eat" for a plate-fork-knife emoji or image, and/or the like. In some implementations, the application platform, a third party, and/or the like may provide emojis, or images, and/or corresponding text phrases (e.g., prestored in the application platform and/or the like) for users to select to create passwords.

As shown in FIG. 1B, and as shown by reference number 120, the application platform may provide, to the user device, the emojis and/or images for user selection. As shown by reference number 125, the user may select one or more emojis and/or images as an input of the user's password, and as shown by reference number 130, the application platform may receive, from the user device, the user's selections. As shown by reference number 135, the application platform may identify and obtain, from the emoji/image to text mapping data structure, a corresponding text phrase for each selected emoji and/or image.

As shown in FIG. 1C, and as shown by reference number 140, the application platform may concatenate the text phrases. For example, in a case where the user selects a happy-face emoji or image (e.g., mapped to the text phrase "I am happy"), a plate-fork-knife emoji or image (e.g., mapped to the text phrase "when I eat"), a pepper emoji or image (e.g., mapped to the text phrase "spicy foods"), and a house emoji or image (e.g., mapped to the text phrase "at home"), the application platform may identify the text phrases and concatenate the text phrases—e.g., to derive the full text phrase "I am happy when I eat spicy foods at home."

As shown by reference number 145, the application platform may hash the concatenated text phrase, and perform a search for a match in the hashed password data structure. For example, the application platform may hash the concatenated text phrase using one or more hashing algorithms to derive a hashed value. In some implementations, the application platform may salt the concatenated text phrase with a salt value (e.g., a salt value associated with the user's user ID and stored in the hashed password data structure) prior to performing the hashing. As shown by reference number 150, the application platform may authenticate the user if a match is found. For example, the application platform may determine whether the derived hashed value corresponds to a hashed value, stored in the hashed password data structure and associated with the user, and authenticate the user if the derived hashed value corresponds to the stored hashed value.

In some implementations, the application platform may cause the user device to provide the user with an option to enter the user's password in text format (e.g., as a text input "I am happy when I eat spicy foods at home") as an alternative to selecting emojis and/or images. In a case where the user chooses to enter the user's password in such a manner, the application platform may authenticate the user by simply accessing the hashed password data structure (e.g., without accessing the emoji/image to text mapping data structure).

In some implementations, the application platform may be configured to determine (e.g., based on information provided by the user device) whether the user device is equipped with an emoji-based keyboard. In a case where the application platform determines that the user device is equipped with an emoji-based keyboard, the application platform may cause the user device to display only the option of inputting the user's password via emoji and/or image selections (and not the option of inputting the user's password in text format).

In some implementations, the application platform may choose emojis and/or images, to be displayed to a user, from a repository of emojis and/or images stored in the emoji/image to text mapping data structure. In some implementations, the application platform may filter through the repository to identify appropriate emojis and/or images to be displayed (e.g., based on the user's user ID and/or the like).

Although not shown, in some implementations, the application platform may, as part of a user authentication process, cause the user device to first display an initial set of emojis and/or images for user selection, and cause the user device to adjust what is displayed after each user selection. For example, in a case where the user selects a first emoji and/or image from the initial set of emojis and/or images, the application platform may cause the user device to remove the first emoji and/or image from the display. Continuing with the example, if the user subsequently selects a second emoji and/or image from the remaining displayed emojis and/or images, the application platform may cause the user device to further remove the second emoji and/or image from the display, and so on, until the user has completed selection of emojis and/or images. As another example, in a case where the user selects a first emoji and/or image from the initial set of emojis and/or images, the application platform may cause the user device to remove all the displayed emojis and/or images, including the first emoji and/or image, from the display, and display a new set of emojis and/or images for subsequent user selection. Continuing with the example, if the user subsequently selects a second emoji and/or image from the new set of emojis and/or images, the application platform may cause the user device to remove all the displayed emojis and/or images, including the second emoji and/or image, from the display, and display yet another new set of emojis and/or images for further user selection, and so on, until the user has completed selection of emojis and/or images.

In some implementations, the user device may provide an option for the user to submit the user's selections to the application platform. In such cases, the application platform may attempt to authenticate the user after the user selects the option. In some implementations, the application platform may be configured to verify each selection, of an emoji and/or image, immediately, or near immediately, after the selection is made. In such cases, the user device may, for each selection made by the user, provide the selection to the application platform for verification, after which the application platform may determine whether the selected emoji and/or image is one of the emojis and/or images associated with the user's user ID. If a selected emoji and/or image is not one of the emojis and/or images associated with the user's user ID, the application platform may cause the user device to alert the user that an incorrect emoji and/or image has been selected.

Various implementations, described herein, may be applied to an automated teller machine (ATM) device. For example, if an ATM device includes a capacitive touch screen, the ATM device may present emojis and/or images for user selection via the capacitive touch screen. As another example, a user device may include an application that provides a user interface configured to display emojis and/or images for user selection. In this case, the application may communicate with the ATM device (e.g., via a communication session established between the user device and the ATM device) to receive the emojis and/or images from the ATM device and to provide the user's selections to the ATM device for authentication. As yet another example, if an ATM device includes a display (e.g., a display that lacks capacitive touch screen feature(s)) and a keypad, the ATM device may display the emojis and/or images along with information indicating which keys, of the keypad, correspond to which emoji and/or image (e.g., information indicating that the key '1' corresponds to a happy-face emoji, that the key '2' corresponds to a beach emoji, and/or the like), so that a user may input an emoji-based password or an image-based password using the keypad. As a further example, a user device may include an augmented reality application configured to overlay emojis and/or images on a live image of the keypad captured by a camera of the user device. In this case, a user may view, on the user device, emojis and/or images that correspond to the keys of the keypad, and select the appropriate keys to input a password.

In some implementations, the application platform may adjust a pattern, or order, of display of a set of emojis and/or images each time a user is requested to input the user's password, and/or each time a user selects an emoji and/or image in the set of displayed emojis and/or images. For example, an initial set of emojis may be presented in a first order (e.g., in an x by y (where x and y are integers) pattern, where a happy-face emoji is located at a top left position of the pattern, a sad-face emoji is located at a bottom middle position of the pattern, a beach emoji is located at a middle left position of the pattern, and/or the like), and, after a user selects one of the emojis in the initial set of emojis (e.g., the happy-face emoji), a portion of the initial set of emojis (e.g., all the other emojis, in the set of emojis, other than the happy-face emoji) may be randomly displayed in a different order (e.g., where the sad-face emoji may be moved to a right middle position of the pattern, the beach emoji is moved to a top middle position of the pattern, and/or the like). Random reordering in this manner may limit the ability of a nearby malicious user, such as a "shoulder surfer" and/or the like, to identify a user's emoji-based password during password input, thereby safeguarding the user's password during password entry. As another example, random ordering may be implemented such that an order of displayed emojis and/or images is different each time a user logs into the application platform (e.g., from one login session to a subsequent login session). This prevents a malicious user from merely observing and/or recording a user's actions (e.g., emoji and/or image selections) during password entry, and duplicating such actions (e.g., based solely on areas of a capacitive touch screen that a user touched to input the user's password) to gain access to the user's account.

In some implementations, the application platform may cause the user device to display emojis and/or images, that correspond to a user's password, closer in position to one another, to make it easier for the user to identify and select the appropriate emojis and/or images during password entry. This permits for faster password entry, thereby conserving computing resources and/or power resources.

In some implementations, the application platform may, during password creation, permit a user to indicate whether the emojis and/or images are to be selected in a particular sequence when inputting the password. For example, in a case where the user wants to set a password based on the happy-face emoji, the heart emoji, the plate-knife-fork emoji, and the pepper emoji, the application platform may permit the user to indicate whether these emojis must be entered in a particular sequence when inputting the password (e.g., first the happy-face emoji, then the heart emoji, and so on). If the user indicates that the emojis must be selected in the particular sequence when inputting the password, the application platform may authenticate a login request only if the emojis are selected in that particular order (i.e., first the happy-face emoji, then the heart emoji, and so on). In such a case, the application platform may store, in the emoji/image to text mapping data structure, information that associates each chosen emoji with a position, or order, index value. For example, if the user's password is based on the happy-face emoji, the heart emoji, the plate-knife-fork emoji, and the pepper emoji (in that particular order), the application platform may store information indicating that the happy-face emoji is the first emoji in the password, the plate-knife-fork emoji is the second emoji in the password, and so on, and may check to ensure that the emojis are selected in this order when a user inputs the password during the authentication process. In some implementations, the application platform may receive all of a user's selections of emojis and/or images (and, for example, assume that an order of selection of the emojis and/or images is correct), identify the corresponding text phrases in the emoji/image to text mapping data structure, concatenate the text phrases, and salt/hash the concatenated text phrase for matching in the hashed password data structure.

In a case where, during password creation, a user sets a password based on a set of emojis (e.g., first the happy-face emoji, then the heart emoji, then the plate-knife-fork emoji, and then the pepper emoji), and indicates, to the application platform, that the emojis may be selected in any order during password input, the application platform may authenticate a login request so long as all of the emojis are selected during login (e.g., so long as the happy-face emoji, the heart emoji, the plate-knife-fork emoji, and the pepper emoji are selected, regardless of a sequence of the selection). In such a case, if the user inputs the password by selecting the emojis in a random order (e.g., first the pepper emoji, then the plate-knife-fork emoji, then the happy-face emoji, and then the heart emoji), the application platform may, as part of the authentication process, determine that the appropriate emojis have been selected, identify the corresponding text phrases, reorder the text phrases as needed (e.g., such that the text phrase, corresponding to the happy-face emoji precedes the text phrase corresponding to the heart emoji, which, in turn, precedes the text phrase corresponding to the plate-knife-fork emoji, and which, in turn, precedes the text phrase corresponding to the pepper emoji), and concatenate the reordered text phrases, such that the appropriate, full text phrase is hashed for comparison with the hashed value stored in the hashed password data structure.

In this way, the information needed, by a malicious actor to fully uncover a user's password, may be stored in separate places (e.g., separate data structures), which provides an additional layer of password security, since the malicious actor will need to breach not one, but two data structures in order to obtain the information. In addition, permitting emojis, or images, to be mapped to text phrases (e.g., customized text phrases, and not Unicodes that are typically associated with emojis) provides a user with flexibility in choosing a long and unique password (e.g., including many emojis, or images, mapped to many text phrases), which is more difficult, and more time consuming, for a malicious actor to decipher than a typical password, thereby further improving password security. Furthermore, a password based on emojis, or images, is easier to remember, which reduces or eliminates a need for a user to change the password (in the event that the user forgets the password), thereby conserving computing resources and memory resources that would otherwise need to be expended to facilitate password recovery, and improving the user's overall experience.

As indicated above, FIGS. 1A-1C are provided merely as examples. Other examples are possible and may differ from what was described with regard to FIGS. 1A-1C. For example, various implementations, described herein, apply equally or similarly to account-based security questions that are typically used for password recovery purposes. As another example, various implementations, described herein, apply equally or similarly to any system that utilizes a password and/or the like for controlling access (e.g., an ATM system, a computer system, a security door system, an automobile security system, and/or the like).

Figure 2:
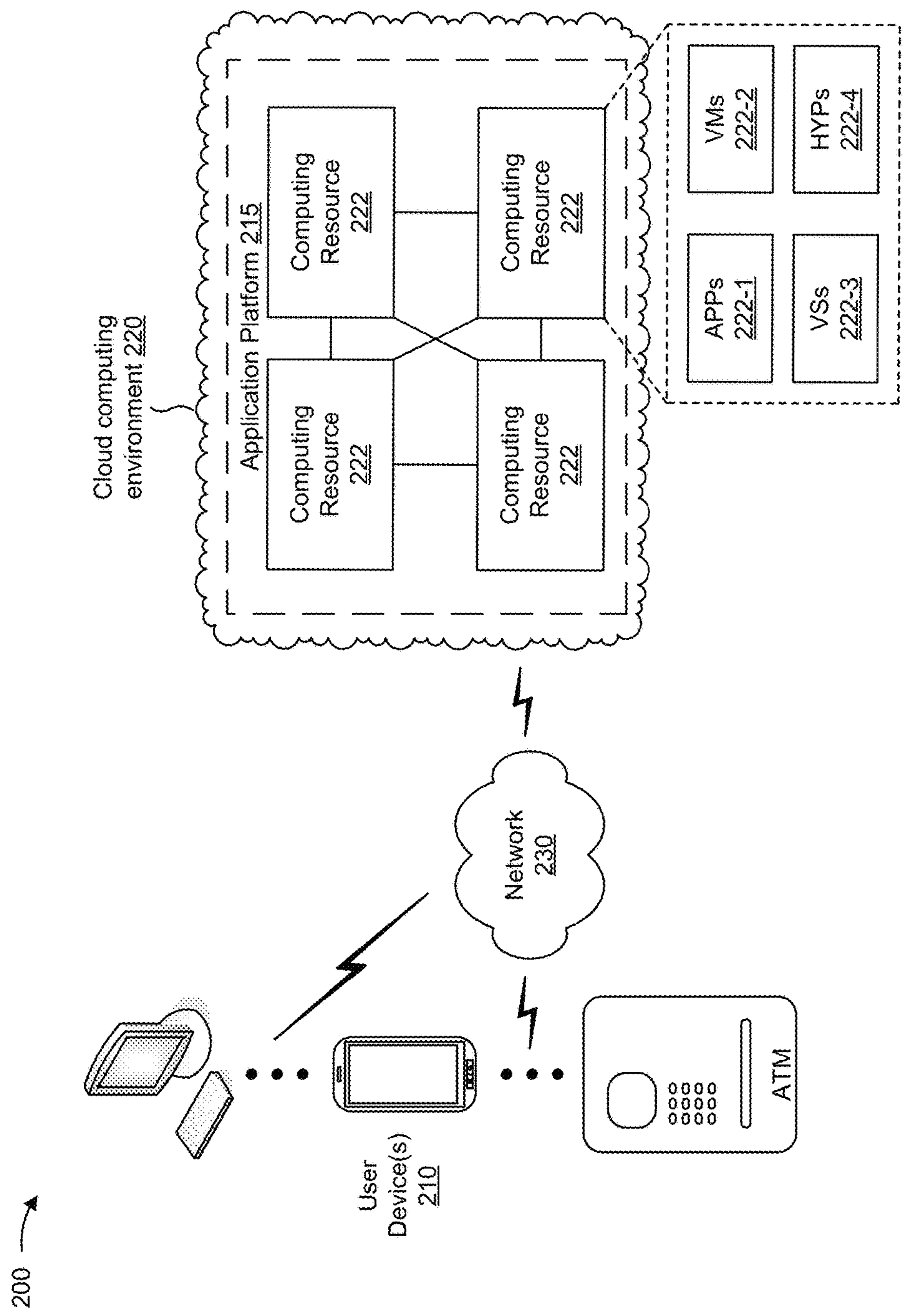
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an application platform 215, a cloud computing environment 220, and a network 230. Devices of environment 200 may interconnect via wired connections, wireless connections, or a combination of wired and wireless connections.

User device 210 includes one or more devices capable of receiving, generating, storing, processing, and/or providing information associated with a user. For example, user device 210 may include a communication and/or computing device, such as a mobile phone (e.g., a smart phone, a radiotelephone, etc.), a desktop computer, a laptop computer, a tablet computer, a handheld computer, a gaming device, a device integrated within a vehicle, a wearable communication device (e.g., a smart wristwatch, a pair of smart eyeglasses, etc.), an ATM, or a similar type of device. In some implementations, user device 210 may receive from a user, and provide to application platform 215, inputs, relating to a request to access the user's account, including the user's user ID, selection(s) of emojis and/or images, and/or the like, as described elsewhere herein.

Application platform 215 includes one or more devices capable of receiving, generating, storing, processing, and/or providing information associated with authenticating a user using emoji-based passwords. Application platform 215 may include a server device or a group of server devices. In some implementations, as shown, application platform 215 can be hosted in cloud computing environment 220. Notably, while implementations described herein describe application platform 215 as being hosted in cloud computing environment 220, in some implementations, application platform 215 is not cloud-based or can be partially cloud-based. Application platform 215 may obtain, from user device 210, user input(s) relating to a request to access a user's account, and process the input(s) in connection with one or more data structures, such as an emoji/image to text mapping data structure and a hashed password data structure, to perform user authentication, as described elsewhere herein.

Cloud computing environment 220 includes an environment that delivers computing as a service, whereby shared resources, services, etc. can be provided to user device 210 and/or one or more other application platforms 215. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host application platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by user device 210. Application 222-1 can eliminate a need to install and execute the software applications on user device 210. For example, application 222-1 can include software associated with application platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of a user (e.g., user device 210) and/or on behalf of one or more other application platforms 215, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
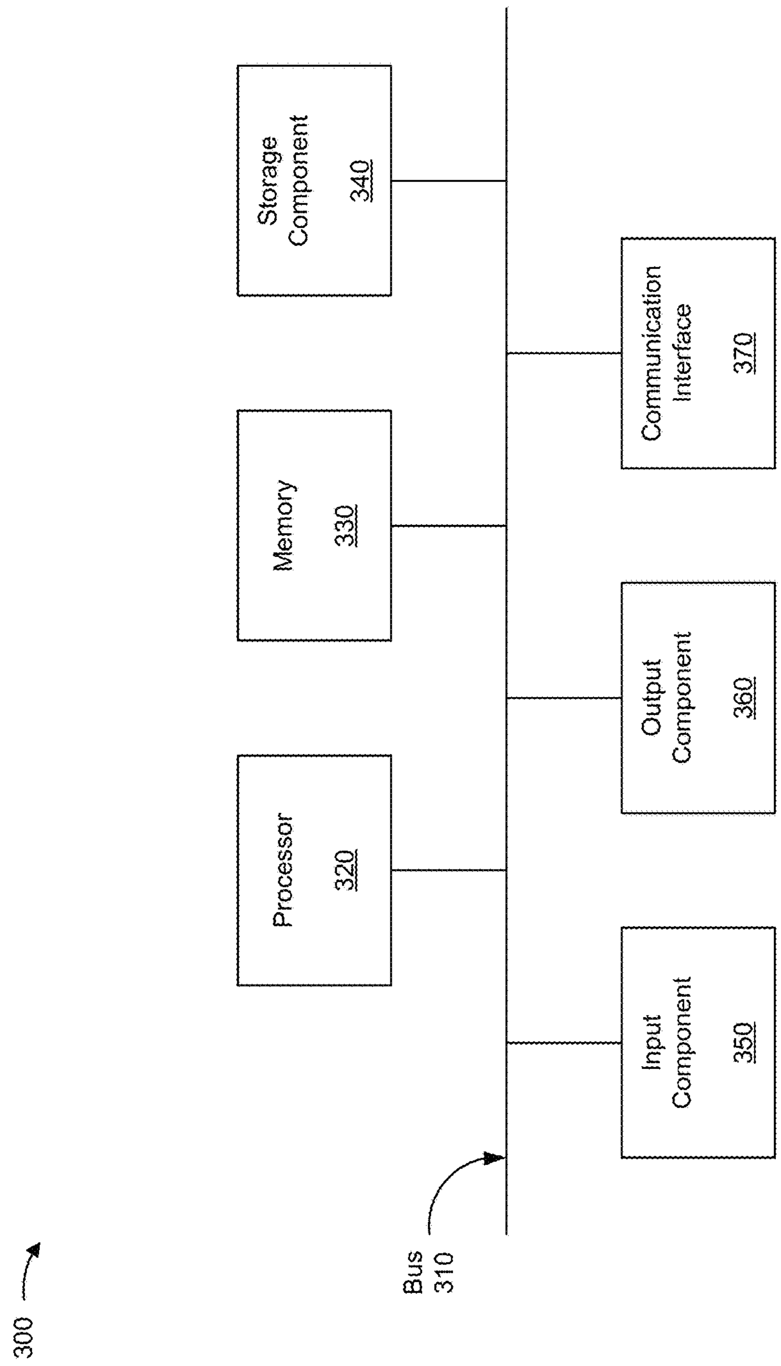
FIG. 3 is a diagram of example components of one or more devices of FIG. 2.

FIG. 3 is a diagram of example components of a device 300. Device 300 may correspond to user device 210 and/or application platform 215. In some implementations, user device 210 and/or application platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
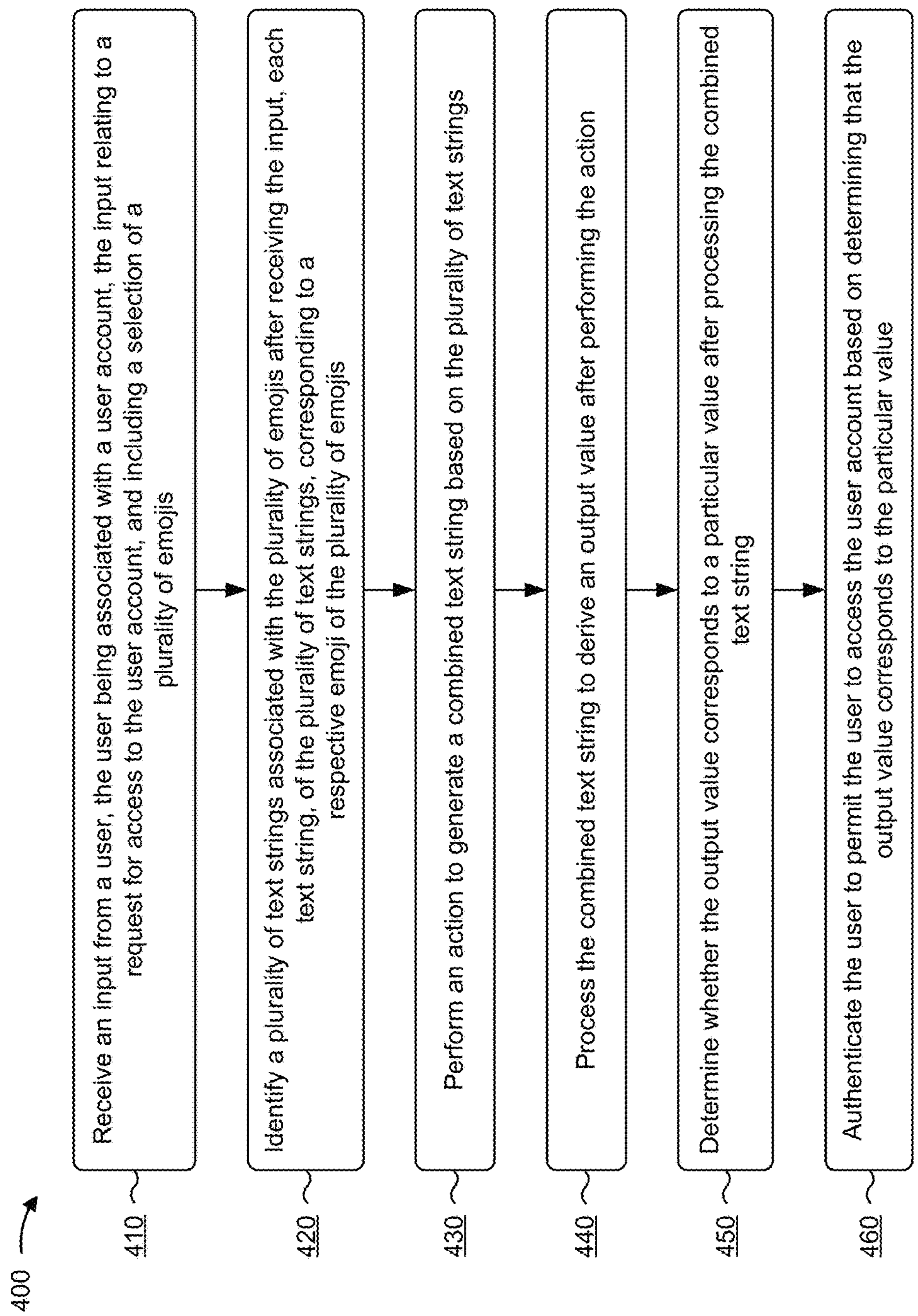
FIG. 4 is a flow chart of an example process for user authentication based on emoji-based passwords.

FIG. 4 is a flow chart of an example process 400 for user authentication based on emoji-based passwords. In some implementations, one or more process blocks of FIG. 4 may be performed by an application platform (e.g., application platform 215). In some implementations, one or more process blocks of FIG. 4 may be performed by another device or a group of devices separate from or including the application platform, such as user device 210.

As shown in FIG. 4, process 400 may include receiving an input from a user, the user being associated with a user account, and the input relating to a request for access to the user account, and including a selection of a plurality of emojis (block 410). For example, the application platform (e.g., using computing resource 222, processor 320, memory 330, storage component 340, input component 350, communication interface 370, and/or the like) may receive an input from a user, as described above in connection with FIGS. 1A-1C. In some implementations, the user may be associated with a user account. In some implementations, the input may relate to a request for access to the user account, and include a selection of a plurality of emojis.

As further shown in FIG. 4, process 400 may include identifying a plurality of text strings associated with the plurality of emojis after receiving the input, each text string, of the plurality of text strings, corresponding to a respective emoji of the plurality of emojis (block 420). For example, the application platform (e.g., using computing resource 222, processor 320, memory 330, storage component 340, and/or the like) may identify a plurality of text strings associated with the plurality of emojis after receiving the input, as described above in connection with FIGS. 1A-1C. In some implementations, each text string, of the plurality of text strings, may correspond to a respective emoji of the plurality of emojis.

As further shown in FIG. 4, process 400 may include performing an action to generate a combined text string based on the plurality of text strings (block 430). For example, the application platform (e.g., using computing resource 222, processor 320, memory 330, storage component 340, and/or the like) may perform an action to generate a combined text string based on the plurality of text strings, as described above in connection with FIGS. 1A-1C.

As further shown in FIG. 4, process 400 may include processing the combined text string to derive an output value after performing the action (block 440). For example, the application platform (e.g., using computing resource 222, processor 320, memory 330, storage component 340, and/or the like) may process the combined text string to derive an output value after performing the action, as described above in connection with FIGS. 1A-1C.

As further shown in FIG. 4, process 400 may include determining whether the output value corresponds to a particular value after processing the combined text string (block 450). For example, the application platform (e.g., using computing resource 222, processor 320, memory 330, storage component 340, and/or the like) may determine whether the output value corresponds to a particular value after processing the combined text string, as described above in connection with FIGS. 1A-1C.

As further shown in FIG. 4, process 400 may include authenticating the user to permit the user to access the user account based on determining that the output value corresponds to the particular value (block 460). For example, the application platform (e.g., using computing resource 222, processor 320, memory 330, storage component 340, communication interface 370, and/or the like) may authenticate the user to permit the user to access the user account based on determining that the output value corresponds to the particular value, as described above in connection with FIGS. 1A-1C.

Process 400 may include additional implementations, such as any single implementation or any combination of implementations described below and/or in connection with one or more other processes described elsewhere herein.

In some implementations, a first data structure may contain a mapping of each text string, of the plurality of text strings, and the corresponding respective emoji, and a second data structure, different from the first data structure, may contain the particular value. In some implementations, the first data structure may be maintained by a first entity, and the second data structure may be maintained by a second entity different from the first entity.

In some implementations, the application platform may identify the plurality of text strings based on accessing the first data structure. In some implementations, the mapping, of each text string, of the plurality of text strings, and the corresponding respective emoji, may be user-defined. In some implementations, the application platform may determine whether the output value corresponds to the particular value based on accessing the second data structure.

In some implementations, the application platform may cause a set of emojis, that includes the plurality of emojis and additional emojis, to be initially presented for selection, and may cause a portion of the set of emojis to be subsequently presented after an emoji in the set of emojis is selected. In some implementations, the portion of the set of emojis may not include the emoji that is selected.

In some implementations, the application platform may cause a set of emojis, that includes the plurality of emojis and additional emojis, to be initially presented in a first pattern or sequence, and may cause at least a portion of the set of emojis to be subsequently presented in a second pattern or sequence, different from the first pattern or sequence, after an emoji in the set of emojis is selected.

In some implementations, the application platform may receive an initial user input prior to receiving the user input, and may cause, prior to receiving the user input, a set of emojis, that includes the plurality of emojis and additional emojis, to be presented based on receiving the initial user input. In some implementations, the initial user input may include user identification information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
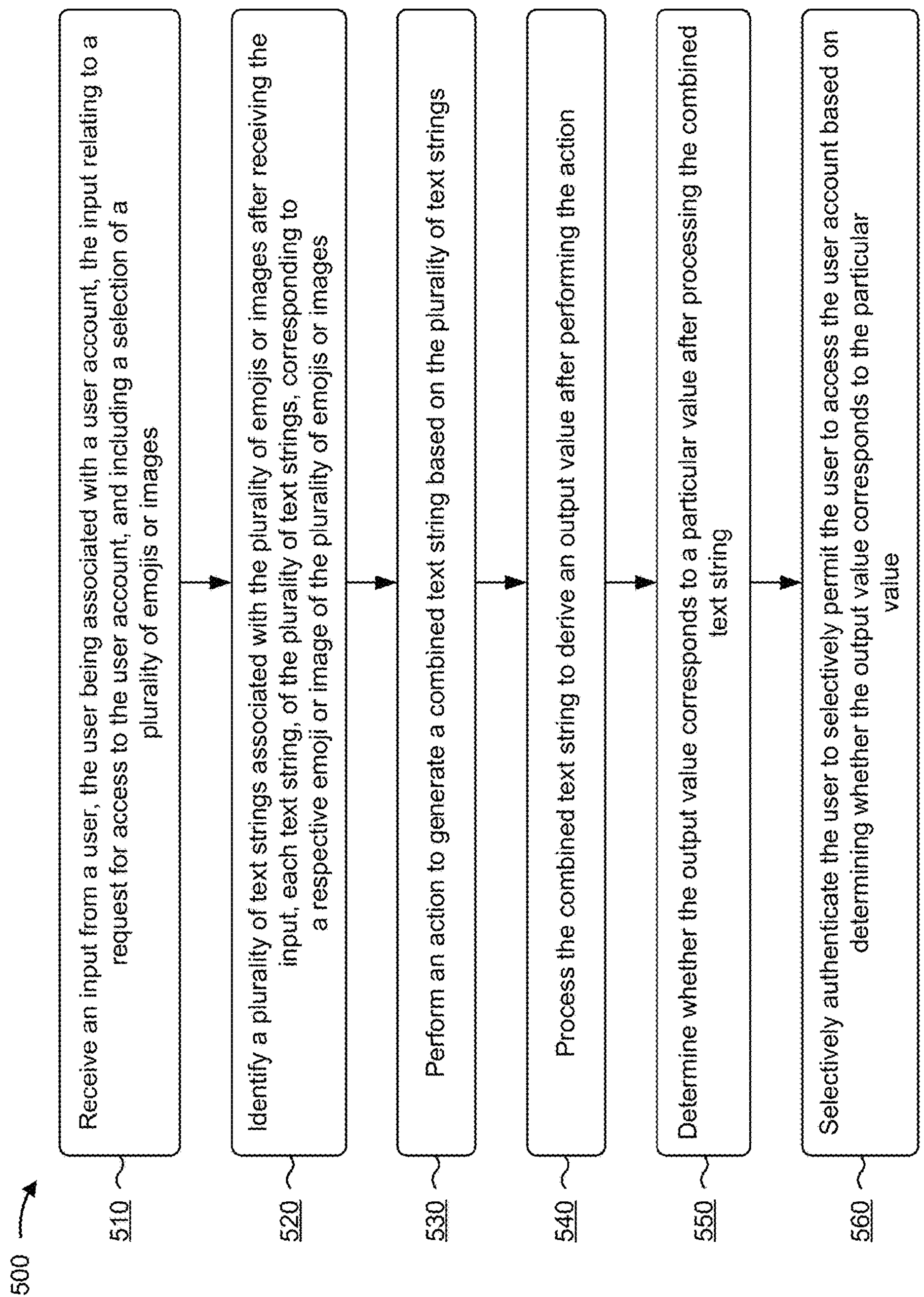
FIG. 5 is a flow chart of an example process for user authentication based on emoji-based passwords.

FIG. 5 is a flow chart of an example process 500 for user authentication based on emoji-based passwords. In some implementations, one or more process blocks of FIG. 5 may be performed by an application platform (e.g., application platform 215). In some implementations, one or more process blocks of FIG. 5 may be performed by another device or a group of devices separate from or including the application platform, such as user device 210. In some implementations, a device (e.g., the application platform) may include one or more memories, and one or more processors, communicatively coupled to the one or more memories, configured to perform process 500.

As shown in FIG. 5, process 500 may include receiving an input from a user, the user being associated with a user account, the input relating to a request for access to the user account, and including a selection of a plurality of emojis or images (block 510). For example, the application platform (e.g., using computing resource 222, processor 320, memory 330, storage component 340, input component 350, communication interface 370, and/or the like) may receive an input from a user, as described above in connection with FIGS. 1A-1C. In some implementations, the user may be associated with a user account. In some implementations, the input may relate to a request for access to the user account, and include a selection of a plurality of emojis or images.

As further shown in FIG. 5, process 500 may include identifying a plurality of text strings associated with the plurality of emojis or images after receiving the input, each text string, of the plurality of text strings, corresponding to a respective emoji or image of the plurality of emojis or images (block 520). For example, the application platform (e.g., using computing resource 222, processor 320, memory 330, storage component 340, and/or the like) may identify a plurality of text strings associated with the plurality of emojis or images after receiving the input, as described above in connection with FIGS. 1A-1C. In some implementations, each text string, of the plurality of text strings, may correspond to a respective emoji or image of the plurality of emojis or images.

As further shown in FIG. 5, process 500 may include performing an action to generate a combined text string based on the plurality of text strings (block 530). For example, the application platform (e.g., using computing resource 222, processor 320, memory 330, storage component 340, and/or the like) may perform an action to generate a combined text string based on the plurality of text strings, as described above in connection with FIGS. 1A-1C.

As further shown in FIG. 5, process 500 may include processing the combined text string to derive an output value after performing the action (block 540). For example, the application platform (e.g., using computing resource 222, processor 320, memory 330, storage component 340, and/or the like) may process the combined text string to derive an output value after performing the action, as described above in connection with FIGS. 1A-1C.

As further shown in FIG. 5, process 500 may include determining whether the output value corresponds to a particular value after processing the combined text string (block 550). For example, the application platform (e.g., using computing resource 222, processor 320, memory 330, storage component 340, and/or the like) may determine whether the output value corresponds to a particular value after processing the combined text string, as described above in connection with FIGS. 1A-1C.

As further shown in FIG. 5, process 500 may include selectively authenticating the user to selectively permit the user to access the user account based on determining whether the output value corresponds to the particular value (block 560). For example, the application platform (e.g., using computing resource 222, processor 320, memory 330, storage component 340, communication interface 370, and/or the like) may selectively authenticate the user to selectively permit the user to access the user account based on determining whether the output value corresponds to the particular value, as described above in connection with FIGS. 1A-1C.

Process 500 may include additional implementations, such as any single implementation or any combination of implementations described below and/or in connection with one or more other processes described elsewhere herein.

In some implementations, the particular value may include a hashed value. In some implementations, one or more of the plurality of emojis or images may be provided by the user for use with authenticating requests to access the user account. In some implementations, the one or more processors may be configured to concatenate the plurality of text strings to generate the combined text string. In some implementations, the one or more processors may be configured to cause a salt value to be appended to the combined text string to arrive at a salted text string, and may cause the salted text string to be hashed, in accordance with a hashing algorithm, to obtain the output value.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
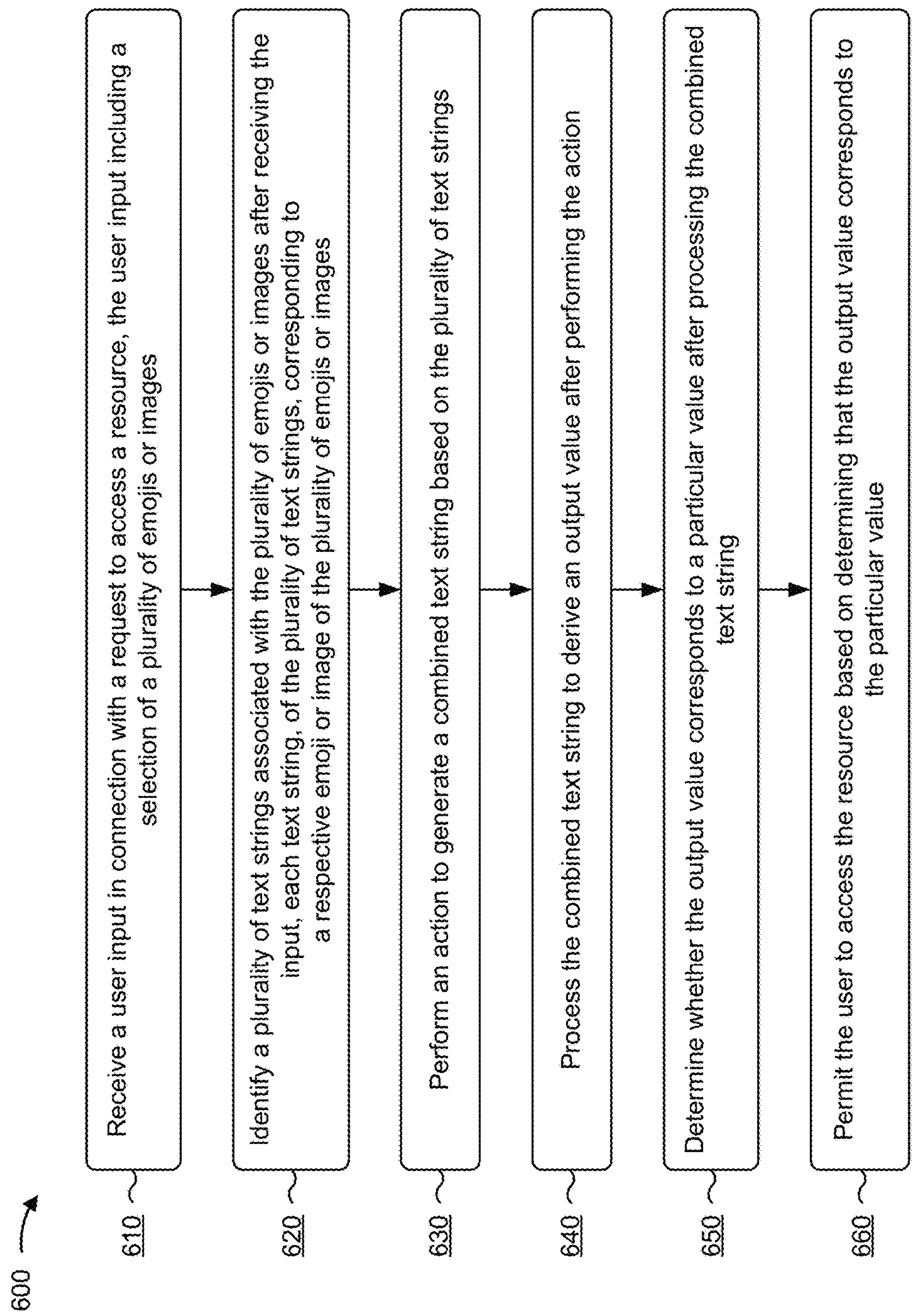
FIG. 6 is a flow chart of an example process for user authentication based on emoji-based passwords.

FIG. 6 is a flow chart of an example process 600 for user authentication based on emoji-based passwords. In some implementations, one or more process blocks of FIG. 6 may be performed by an application platform (e.g., application platform 215). In some implementations, one or more process blocks of FIG. 6 may be performed by another device or a group of devices separate from or including the application platform, such as user device 210. In some implementations, a non-transitory computer-readable medium may store instructions, including one or more instructions that, when executed by one or more processors of a device (e.g., the application platform), cause the one or more processors to perform process 600.

As shown in FIG. 6, process 600 may include receiving a user input in connection with a request to access a resource, the user input including a selection of a plurality of emojis or images (block 610). For example, the application platform (e.g., using computing resource 222, processor 320, memory 330, storage component 340, input component 350, communication interface 370, and/or the like) may receive a user input in connection with a request to access a resource, as described above in connection with FIGS. 1A-1C. In some implementations, the user input may include a selection of a plurality of emojis or images.

As further shown in FIG. 6, process 600 may include identifying a plurality of text strings associated with the plurality of emojis or images after receiving the input, each text string, of the plurality of text strings, corresponding to a respective emoji or image of the plurality of emojis or images (block 620). For example, the application platform (e.g., using computing resource 222, processor 320, memory 330, storage component 340, and/or the like) may identify a plurality of text strings associated with the plurality of emojis or images after receiving the input, as described above in connection with FIGS. 1A-1C. In some implementations, each text string, of the plurality of text strings, may correspond to a respective emoji or image of the plurality of emojis or images.

As further shown in FIG. 6, process 600 may include performing an action to generate a combined text string based on the plurality of text strings (block 630). For example, the application platform (e.g., using computing resource 222, processor 320, memory 330, storage component 340, and/or the like) may perform an action to generate a combined text string based on the plurality of text strings, as described above in connection with FIGS. 1A-1C.

As further shown in FIG. 6, process 600 may include processing the combined text string to derive an output value after performing the action (block 640). For example, the application platform (e.g., using computing resource 222, processor 320, memory 330, storage component 340, and/or the like) may process the combined text string to derive an output value after performing the action, as described above in connection with FIGS. 1A-1C.

As further shown in FIG. 6, process 600 may include determining whether the output value corresponds to a particular value after processing the combined text string (block 650). For example, the application platform (e.g., using computing resource 222, processor 320, memory 330, storage component 340, and/or the like) may determine whether the output value corresponds to a particular value after processing the combined text string, as described above in connection with FIGS. 1A-1C.

As further shown in FIG. 6, process 600 may include permitting the user to access the resource based on determining that the output value corresponds to the particular value (block 660). For example, the application platform (e.g., using computing resource 222, processor 320, memory 330, storage component 340, communication interface 370, and/or the like) may permit the user to access the resource based on determining that the output value corresponds to the particular value, as described above in connection with FIGS. 1A-1C.

Process 600 may include additional implementations, such as any single implementation or any combination of implementations described below and/or in connection with one or more other processes described elsewhere herein.

In some implementations, the plurality of text strings may not include Unicodes. In some implementations, a first data structure may contain a mapping of each text string of a first set of text strings, of the plurality of text strings, and the respective emojis or images corresponding to the first set of text strings, a second data structure, different from the first data structure, may contain a mapping of each text string of a second set of text strings, of the plurality of text strings, and the respective emojis or images corresponding to the second set of text strings, and a third data structure, different from the first data structure and the second data structure, may contain the particular value.

In some implementations, the first data structure may be maintained by a first entity, and the second data structure and the third data structure may be maintained by a second entity different from the first entity. In some implementations, the first data structure may be maintained by a first entity, the second data structure may be maintained by a second entity different from the first entity, and the third data structure may be maintained by a third entity different from the first entity and the second entity.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the information needed, by a malicious actor to fully uncover a user's password, may be stored in separate places (e.g., separate data structures), which provides an additional layer of password security, since the malicious actor will need to breach not one, but two data structures in order to obtain the information. In addition, permitting emojis, or images, to be mapped to text phrases (e.g., customized text phrases, and not Unicodes that are typically associated with emojis) provides a user with flexibility in choosing a long and unique password (e.g., including many emojis, or images, mapped to many text phrases), which is more difficult, and more time consuming, for a malicious actor to decipher than a typical password, thereby further improving password security. Furthermore, a password based on emojis, or images, is easier to remember, which reduces or eliminates a need for a user to change the password (in the event that the user forgets the password), thereby conserving computing resources and memory resources that would otherwise need to be expended to facilitate password recovery, and improving the user's overall experience.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:

receiving, by a device, an input from a user, the user being associated with a user account, the input relating to a request for access to the user account, and including a selection of a plurality of emojis;

identifying, by the device, a plurality of text strings associated with the plurality of emojis after receiving the input, each text string, of the plurality of text strings, corresponding to a respective emoji of the plurality of emojis;

performing, by the device, an action to generate a combined text string based on the plurality of text strings;

processing, by the device, the combined text string to derive an output value after performing the action;

determining, by the device, whether the output value corresponds to a particular value after processing the combined text string; and authenticating, by the device, the user to permit the user to access the user account based on determining that the output value corresponds to the particular value.

2. The method of claim 1, wherein a first data structure contains a mapping of each text string, of the plurality of text strings, and the corresponding respective emoji; and wherein a second data structure, different from the first data structure, contains the particular value.

3. The method of claim 2, wherein the first data structure is maintained by a first entity, and the second data structure is maintained by a second entity different from the first entity.

4. The method of claim 2, wherein identifying the plurality of text strings comprises:

identifying the plurality of text strings based on accessing the first data structure.

5. The method of claim 2, wherein the mapping, of each text string, of the plurality of text strings, and the corresponding respective emoji, is user-defined.

6. The method of claim 2, wherein determining whether the output value corresponds to the particular value comprises:

determining whether the output value corresponds to the particular value based on accessing the second data structure.

7. The method of claim 1, further comprising:

causing a set of emojis, that includes the plurality of emojis and additional emojis, to be initially presented for selection; and causing a portion of the set of emojis to be subsequently presented after an emoji in the set of emojis is selected, the portion of the set of emojis not including the emoji that is selected.

8. The method of claim 1, further comprising:

causing a set of emojis, that includes the plurality of emojis and additional emojis, to be initially presented in a first pattern or sequence; and causing at least a portion of the set of emojis to be subsequently presented in a second pattern or sequence, different from the first pattern or sequence, after an emoji in the set of emojis is selected.

9. The method of claim 1, further comprising:

receiving an initial user input prior to receiving the input; and causing, prior to receiving the input, a set of emojis, that includes the plurality of emojis and additional emojis, to be presented based on receiving the initial user input.

10. The method of claim 9, wherein the initial user input includes user identification information.

11. A device, comprising:

one or more memories; and one or more processors, communicatively coupled to the one or more memories, configured to:

receive an input from a user, the user being associated with a user account, the input relating to a request for access to the user account, and including a selection of a plurality of emojis or images;

identify a plurality of text strings associated with the plurality of emojis or images after receiving the input, each text string, of the plurality of text strings, corresponding to a respective emoji or image of the plurality of emojis or images;

perform an action to generate a combined text string based on the plurality of text strings;

process the combined text string to derive an output value after performing the action;

determine whether the output value corresponds to a particular value after processing the combined text string; and selectively authenticate the user to selectively permit the user to access the user account based on determining whether the output value corresponds to the particular value.

12. The device of claim 11, wherein the particular value includes a hashed value.

13. The device of claim 11, wherein one or more of the plurality of emojis or images are provided by the user for use with authenticating requests to access the user account.

14. The device of claim 11, wherein the one or more processors, when performing the action, are configured to:

concatenate the plurality of text strings to generate the combined text string.

15. The device of claim 11, wherein the one or more processors, when processing the combined text string, are configured to:

cause a salt value to be appended to the combined text string to arrive at a salted text string; and cause the salted text string to be hashed, in accordance with a hashing algorithm, to obtain the output value.

16. A non-transitory computer-readable medium storing instructions, the instructions comprising:

one or more instructions that, when executed by one or more processors, cause the one or more processors to:

receive a user input in connection with a request to access a resource, the user input including a selection of a plurality of emojis or images;

identify a plurality of text strings associated with the plurality of emojis or images after receiving the user input, each text string, of the plurality of text strings, corresponding to a respective emoji or image of the plurality of emojis or images;

perform an action to generate a combined text string based on the plurality of text strings;

process the combined text string to derive an output value after performing the action;

determine whether the output value corresponds to a particular value after processing the combined text string; and permit the user to access the resource based on determining that the output value corresponds to the particular value.

17. The non-transitory computer-readable medium of claim 16, wherein the plurality of text strings does not include Unicodes.

18. The non-transitory computer-readable medium of claim 16, wherein a first data structure contains a mapping of each text string of a first set of text strings, of the plurality of text strings, and the respective emojis or images corresponding to the first set of text strings;

wherein a second data structure, different from the first data structure, contains a mapping of each text string of a second set of text strings, of the plurality of text strings, and the respective emojis or images corresponding to the second set of text strings; and wherein a third data structure, different from the first data structure and the second data structure, contains the particular value.

19. The non-transitory computer-readable medium of claim 18, wherein the first data structure is maintained by a first entity, and the second data structure and the third data structure are maintained by a second entity different from the first entity.

20. The non-transitory computer-readable medium of claim 18, wherein the first data structure is maintained by a first entity, the second data structure is maintained by a second entity different from the first entity, and the third data structure is maintained by a third entity different from the first entity and the second entity.

* * * * *